US006817412B2

(12) United States Patent
Haase

(10) Patent No.: US 6,817,412 B2
(45) Date of Patent: Nov. 16, 2004

(54) METHOD AND APPARATUS FOR THE OPTIMAL PREDISTORTION OF AN ELECTROMAGNETIC SIGNAL IN A DOWNHOLE COMMUNICATION SYSTEM

(75) Inventor: Mark Christopher Haase, Chardon, OH (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/779,935

(22) Filed: Jun. 28, 2001

(65) Prior Publication Data

US 2002/0000316 A1 Jan. 3, 2002

(51) Int. Cl.$^7$ .............................. H04B 1/62; E21B 47/00
(52) U.S. Cl. ............................... 166/250.01; 166/254.2; 175/40
(58) Field of Search .................. 166/250.01, 253.1, 166/254.1, 254.2, 250.03; 175/40, 45, 46, 48, 50

(56) References Cited

U.S. PATENT DOCUMENTS

| | | | |
|---|---|---|---|
| 525,668 A | 9/1894 | Mottinger | |
| 2,917,004 A | 12/1959 | Davis et al. | |
| 3,083,771 A | 4/1963 | Chapman | |
| 3,247,904 A | 4/1966 | Wakefield, Jr. | |
| 3,427,989 A | 2/1969 | Bostock et al. | |
| 3,566,963 A | 3/1971 | Blackedge | 166/189 |
| 3,602,305 A | 8/1971 | Kisling, III | 116/134 |
| 3,732,728 A | 5/1973 | Fitzpatrick | 73/151 |
| 3,814,545 A | 6/1974 | Waters | 417/90 |
| 3,837,618 A | 9/1974 | Juhel | 251/129 |
| 3,980,826 A | * 9/1976 | Widmer | 178/68 |
| 4,068,717 A | 1/1978 | Needham | 166/272 |
| 4,295,795 A | 10/1981 | Gass et al. | 417/111 |

(List continued on next page.)

FOREIGN PATENT DOCUMENTS

| | | | |
|---|---|---|---|
| EP | 28296 | 5/1981 | ........... E21B/47/12 |
| EP | 295178 | 12/1988 | |

(List continued on next page.)

OTHER PUBLICATIONS

Search Report dated May 21, 2001.
Brown.Connolizo and Robertson, West Texas Oil Lifting Short Cours and H.W. Winkler, "Misunderstood or overlooked Gas–Lift Design an Equipment Considerations," SPE, p. 351 (1994).
Der Spek. Alex, and Aliz Thomas, "Neural–Net Identification of Flow Regime with Band Spectra of Flow–Generated Sound", SPE Reservoir Eva. & Eng.2 (6) Dec. 1999, pp. 489–498.
Sakata et al., "Performance Analysis of Long Distance Transmittin of Magnetic Signal on Cylindrical Steel Rod", IEEE Translation Journal on magnetics in Japan, vol. 8, No. 2, Feb. 1993,, pps 102–106.
Otis Engineering, Aug. 1980, "Heavy Crude Lift System", Field Development Report, OE 5228, Otis Corp., Dallas, Texas, 1980.

*Primary Examiner*—Frank S. Tsay

(57) ABSTRACT

A method and apparatus for communicating a desired target signal along a piping structure is provided. Because of a lossy communication path presented by the piping structure, an input signal, which is transmitted from a first location on the piping structure, is consciously predistorted prior to transmission. The amount and nature of the predistortion applied to the input signal is determined by mathematically modeling the communication path between the first location and a second location. Predistortion of the input signal results in reception of an output signal at the second location that closely approximates the desired target signal. Application of this predistortion method of communicating is described in the context of communicating in the borehole of a petroleum well.

46 Claims, 4 Drawing Sheets

U.S. PATENT DOCUMENTS

| | | | |
|---|---|---|---|
| 4,393,485 A | 7/1983 | Redden | 367/25 |
| 4,468,665 A | 8/1984 | Thawley et al. | 340/856 |
| 4,545,731 A | 10/1985 | Canalizo et al. | 417/86 |
| 4,576,231 A | 3/1986 | Dowling et al. | 166/248 |
| 4,578,675 A | 3/1986 | MacLeod | 340/855 |
| 4,596,516 A | 6/1986 | Scott et al. | 417/58 |
| 4,648,471 A | 3/1987 | Bordon | |
| 4,662,437 A | 5/1987 | Renfro | 166/65.1 |
| 4,681,164 A | 7/1987 | Stacks | 166/304 |
| 4,709,234 A | 11/1987 | Forehand et al. | 340/856 |
| 4,738,313 A | 4/1988 | McKee | 166/372 |
| 4,739,325 A | 4/1988 | MacLeod | 340/854 |
| 4,839,644 A | 6/1989 | Safinya et al. | 340/854 |
| 4,886,114 A | 12/1989 | Perkins et al. | 166/65.1 |
| 4,901,069 A | 2/1990 | Veneruso | 340/853 |
| 4,972,704 A | 11/1990 | Wellington et al. | 73/155 |
| 4,981,173 A | 1/1991 | Perkins et al. | 166/66.4 |
| 5,001,675 A | 3/1991 | Woodward | 367/13 |
| 5,008,664 A | 4/1991 | More et al. | 340/854 |
| 5,130,706 A | 7/1992 | Van Steenwyk | 340/854.6 |
| 5,134,285 A | 7/1992 | Perry et al. | 250/269 |
| 5,160,925 A | 11/1992 | Dailey et al. | |
| 5,162,720 A | 11/1992 | Lambert | 324/317 |
| 5,172,717 A | 12/1992 | Boyle et al. | 137/155 |
| 5,176,164 A | 1/1993 | Boyle | 137/155 |
| 5,230,383 A | 7/1993 | Pringle et al. | 166/66.4 |
| 5,246,860 A | 9/1993 | Hutchins et al. | 436/27 |
| 5,251,328 A * | 10/1993 | Shaw | 455/73 |
| 5,257,663 A | 11/1993 | Pringle et al. | 166/66.4 |
| 5,267,469 A | 12/1993 | Espinoza | 73/40.5 |
| 5,278,758 A | 1/1994 | Perry et al. | 364/422 |
| 5,283,768 A * | 2/1994 | Rorden | 367/83 |
| 5,353,627 A | 10/1994 | Diatschenko et al. | 73/19.03 |
| 5,358,035 A | 10/1994 | Grudzinski | 166/53 |
| 5,367,694 A | 11/1994 | Ueno | 395/800 |
| 5,394,141 A | 2/1995 | Soulier | 340/854.4 |
| 5,396,232 A | 3/1995 | Mathieu et al. | 340/854.5 |
| 5,425,425 A | 6/1995 | Bankston et al. | 166/377 |
| 5,447,201 A | 9/1995 | Mohn | 166/375 |
| 5,458,200 A | 10/1995 | Lagerlef et al. | 166/372 |
| 5,467,083 A | 11/1995 | McDonald et al. | 340/854.6 |
| 5,473,321 A * | 12/1995 | Goodman et al. | 340/854.9 |
| 5,493,288 A | 2/1996 | Henneuse | 340/854.4 |
| 5,531,270 A | 7/1996 | Fletcher et al. | 166/53 |
| 5,561,245 A | 10/1996 | Georgi et al. | 73/152.02 |
| 5,574,374 A | 11/1996 | Thompson et al. | 324/338 |
| 5,576,703 A | 11/1996 | MacLeod et al. | 340/854.4 |
| 5,587,707 A | 12/1996 | Dickie et al. | 340/870.09 |
| 5,592,438 A * | 1/1997 | Rorden et al. | 367/83 |
| 5,662,165 A | 9/1997 | Tubel et al. | 166/250.01 |
| 5,723,781 A | 3/1998 | Pruett et al. | 73/152.18 |
| 5,730,219 A | 3/1998 | Tubel et al. | 66/250.01 |
| 5,745,047 A * | 4/1998 | Van Gisbergen et al. | 340/853.1 |
| 5,782,261 A * | 7/1998 | Becker et al. | 137/155 |
| 5,797,453 A * | 8/1998 | Hisaw | 166/117.5 |
| 5,881,807 A * | 3/1999 | Boc et al. | 166/100 |
| 5,883,516 A * | 3/1999 | Van Steenwyk et al. | 324/366 |
| 5,887,657 A * | 3/1999 | Bussear et al. | 166/336 |
| 5,896,924 A * | 4/1999 | Carmody et al. | 166/53 |
| 5,934,371 A * | 8/1999 | Bussear et al. | 166/53 |
| 5,937,945 A * | 8/1999 | Bussear et al. | 166/250.15 |
| 5,941,307 A * | 8/1999 | Tubel | 166/313 |
| 5,955,666 A * | 9/1999 | Mullins | 73/52.18 |
| 5,959,499 A | 9/1999 | Khan et al. | |
| 5,960,883 A | 10/1999 | Tubel et al. | 166/313 |
| 5,963,090 A * | 10/1999 | Fukuchi | 330/149 |
| 5,971,072 A | 10/1999 | Huber et al. | 166/297 |
| 5,975,204 A | 11/1999 | Tubel et al. | 166/250.15 |
| 5,995,020 A | 11/1999 | Owens et al. | 340/854.9 |
| 6,012,015 A | 1/2000 | Tubel | 702/6 |
| 6,012,016 A | 1/2000 | Bilden et al. | 702/12 |
| 6,070,608 A | 6/2000 | Pringle | 137/155 |
| 6,123,148 A | 9/2000 | Oneal | 166/118 |
| 6,148,915 A | 11/2000 | Mullen et al. | 166/278 |
| 6,192,983 B1 | 2/2001 | Neuroth et al. | 166/250.15 |
| 6,208,586 B1 * | 3/2001 | Rorden et al. | 367/35 |
| 6,334,486 B1 | 1/2002 | Carmody et al. | 166/53 |
| 6,484,800 B2 | 11/2002 | Carmody et al. | 166/53 |

FOREIGN PATENT DOCUMENTS

| | | | |
|---|---|---|---|
| EP | 339825 | 11/1989 | E21B/47/12 |
| EP | 492856 | 1/1992 | |
| EP | 492856 A2 | 7/1992 | H04B/1/62 |
| EP | 641916 A2 | 3/1995 | E21B/33/124 |
| EP | 681090 A2 | 11/1995 | E21B/47/18 |
| EP | 697500 A2 | 2/1996 | E21B/49/00 |
| EP | 721053 A1 | 7/1996 | E21B/47/12 |
| EP | 732053 A1 | 9/1996 | A21C/9/04 |
| EP | 919696 A2 | 6/1999 | E21B/47/12 |
| EP | 922835 A2 | 6/1999 | E21B/43/14 |
| EP | 930518 A2 | 7/1999 | G01V/3/12 |
| EP | 964134 A2 | 12/1999 | E21B/43/12 |
| EP | 972909 A2 | 1/2000 | E21B/44/00 |
| EP | 999341 A2 | 5/2000 | E21B/33/124 |
| FR | 2677134 | 12/1992 | E21B/47/12 |
| GB | 2083321 A | 3/1982 | H04B/5/00 |
| GB | 2325919 A | 12/1998 | E21B/43/12 |
| GB | 2327695 A | 2/1999 | E21B/43/12 |
| GB | 2338259 A | 12/1999 | E21B/47/12 |
| WO | 80/00727 * | 4/1980 | E21B/47/12 |
| WO | 93/26135 * | 12/1993 | H04N/1/40 |
| WO | 96/00836 * | 1/1996 | E21B/47/12 |
| WO | 96/24747 | 8/1996 | E21B/43/12 |
| WO | 97/16751 | 5/1997 | G01V/3/00 |
| WO | 97/37103 | 10/1997 | E21B/47/01 |
| WO | 98/20233 | 5/1998 | E21B/43/40 |
| WO | 99/37044 | 7/1999 | H04B/13/02 |
| WO | 99/57417 | 11/1999 | E21B/41/00 |
| WO | 99/60247 | 11/1999 | E21B/43/12 |
| WO | 00/04275 | 1/2000 | E21B/47/01 |
| WO | 00/37770 * | 6/2000 | E21B/37/06 |
| WO | 01/20126 A2 | 3/2001 | E21B/43/12 |
| WO | 01/55555 A1 * | 8/2001 | E21B/47/12 |

* cited by examiner

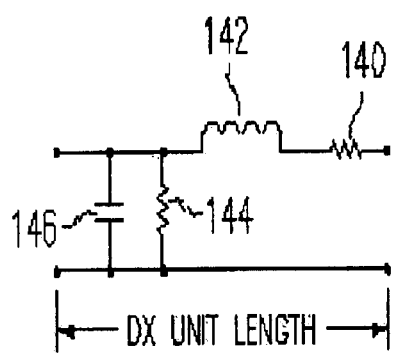
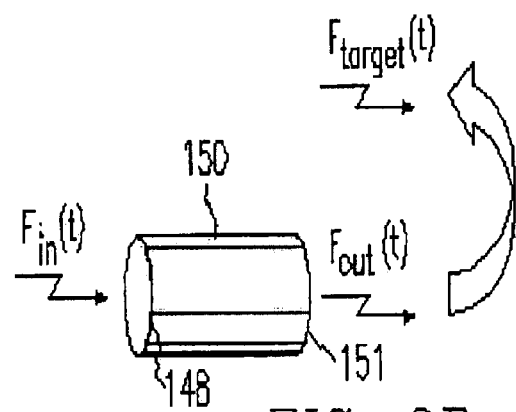
FIG. 3A
FIG. 3B

METHOD AND APPARATUS FOR THE OPTIMAL PREDISTORTION OF AN ELECTROMAGNETIC SIGNAL IN A DOWNHOLE COMMUNICATION SYSTEM

CROSS-REFERENCES TO RELATED APPLICATIONS

This application is related to the U.S. Provisional Applications in the following table, all of which are incorporated herein by reference:

| T&K # | Serial Number | Title | Filing Date |
|---|---|---|---|
| TH 1599US | 09/769,047 | Choke Inductor for Wireless Communication and Control | Jan. 24, 2001 |
| TH 1600US | 09/769,048 | Induction Choke for Power Distribution in Piping Structure | Jan. 24, 2001 |
| TH 1602US | 09/768,705 | Controllable Gas-Lift Well and Valve | Jan. 24, 2001 |
| TH 1603US | 09/768,655 | Permanent Downhole, Wireless, Two-Way Telemetry Backbone Using Redundant Repeater | Jan. 24, 2001 |
| TH 1668US | 09/769,046 | Petroleum Well Having Downhole Sensors, Communication, and Power | Jan. 24, 2001 |
| TH 1669US | 09/768,656 | System and Method for Fluid Flow Optimization | Jan. 24, 2001 |

BACKGROUND OF THE INVENTION

Communication between two locations in an oil or gas well has been achieved using cables and optical fibers to transmit signals between the locations. In a petroleum well, it is, of course, highly undesirable and in practice difficult to use a cable along the tubing string either integral to the tubing string or spaced in the annulus between the tubing string and the casing. The use of a cable presents difficulties for well operators while assembling and inserting the tubing string into a borehole. Additionally, the cable is subjected to corrosion and heavy wear due to movement of the tubing string within the borehole. An example of a downhole communication system using a cable is shown in PCT/EP97/01621.

U.S. Pat. No. 4,839,644 describes a method and system for wireless two-way communications in a cased borehole having a tubing string. However, this system describes a communication scheme for coupling electromagnetic energy in a TEM mode using the annulus between the casing and the tubing. This inductive coupling requires a substantially nonconductive fluid such as crude oil in the annulus between the casing and the tubing. Therefore, the invention described in U.S. Pat. No. 4,839,644 has not been widely adopted as a practical scheme for downhole two-way communication.

Another system for downhole communication using mud pulse telemetry is described in U.S. Pat. Nos. 4,648,471 and 5,887,657. Although mud pulse telemetry can be successful at low data rates, it is of limited usefulness where high data rates are required or where it is undesirable to have complex, mud pulse telemetry equipment downhole. Other methods of communicating within a borehole are described in U.S. Pat. Nos. 4,468,665; 4,578,675; 4,739,325; 5,130,706; 5,467,083; 5,493,288; 5,576,703; 5,574,374; and 5,883,516.

PCT application, WO 93/26115 generally describes a communication system for a sub-sea pipeline installation. Importantly, each sub-sea facility, such as a wellhead, must have its own source of independent power. In the preferred embodiment, the power source is a battery pack for startup operations and a thermoelectric power generator for continued operations. For communications, '115 applies an electromagnetic VLF or ELF signal to the pipe comprising a voltage level oscillating about a DC voltage level. FIGS. 18 and 19 and the accompanying text on pp. 40–42 does describe a crude system and method for getting downhole pressure and temperature measurements. However, the pressure and temperature sensors are passive (Bourdon and bimetallic strip) where movement varys a circuit to provide resonant frequencies related to temperature and pressure. A frequency sweep at the wellhead looks for resonant spikes indicative of pressure and temperature. The data at the well head is transmitted to the surface by cable or the '115 pipeline communication system.

The use of predistorted signals for communicating along a nonlinear transmission path is well documented. U.S. Pat. No. 5,959,499 generally describes a method for determining a complex error signal and (during the operation mode of the system) generating a predistorted drive signal for a nonlinear transmission path. U.S. Pat. No. 5,963,090, generally describes a circuit applying non-linear characteristics to a signal. U.S. Pat. No. 5,251,328, generally describes compensating for amplitude distortion in the communications channel by predistorting the amplitude of transmitted signals. U.S. Pat. No. 4,291,277 generally describes compensating for distortion introduced into a multiamplitude signal format by predistorting the input signals before they are subjected to non-linearities. The degree of predistortion may vary and is updated to reflect changes in the system. U.S. Pat. No. 3,980,826 generally describes a method and means for transmitting a waveform of mixed frequency content over a transmission line to reduce the effects of transmitting digital signals over large distances.

Many of the wireless technologies attracting interest in the oil and gas industry have been derived from the commercial or defense industries. Since an oil well is embedded in a conducting formation and completion fluids are commonly filled with brine, it becomes difficult if not impossible to employ off-the-shelf, turnkey wireless systems in the subsurface environment. Whereas traditional cellular or line-of-sight terrestrial wireless systems enjoy the benefit of transmitting electromagnetic waves in a lossless medium (e.g., the air), subsurface wireless systems must necessarily transmit in a conductive and hence, lossy medium.

One characteristic of this lossy transmission medium is that electromagnetic signals are attenuated at a rate proportional to the square root of the transmitted frequency. This frequency-dependent attenuation is called the "skin effect" resistance or impedance of the transmission line. This skin effect attenuation causes the edges of square wave pulses or general pulses with fast rise times to be smoothed or "smeared." As a result, it becomes increasingly difficult for the receiver detector to resolve and extract the information content of the original signal. Traditionally, to overcome this difficulty, either power must be increased or the data rate must be decreased so as to minimize the bit error rate and maximize the distance between transmitter-receiver pairs.

It would, therefore, be a significant advance in the operation of petroleum wells if an alternate means for compensating for the skin effect resistance of a lossy transmission line were provided. In cases where additional power is not available or the data rate cannot be reduced, an alternate means of compensating for the skin effect resistance is necessary to accurately maintain the integrity of signals transmitted along the line.

All references cited herein are incorporated by reference to the maximum extent allowable by law. To the extent a reference may not be fully incorporated herein, it is incorporated by reference for background purposes and indicative of the knowledge of one of ordinary skill in the art.

SUMMARY OF THE INVENTION

The problems created by the skin effect resistance of a lossy transmission line are solved by predistorting an input signal that will be transmitted along the line. By modeling the transmission line between a first location and a second location, an optimal predistortion can be applied to the input signal before the signal is transmitted from the first location on the transmission line. The predistortion allows an output signal received at the second location on the transmission line to be substantially similar to a desired target signal.

A communication system according to the present invention includes a pipe member with a first modem electrically connected to the pipe member at a first location. A second modem is electrically connected to the pipe member at a second location. A processor is provided for predistorting an input signal transmitted by the first modem to the pipe member. The second modem receives an output signal after the input signal is transmitted by the first modem.

A measurement system is provided for measuring an electrical formation characteristic for a petroleum well having a borehole and a piping structure that is located within the borehole. The measurement system includes a first modem electrically connected to the piping structure at a first location and a second modem electrically connected to the piping structure at a second location. The first modem imparts an input signal to the piping structure that is received as an output signal by the second modem. By observing the signal predistortion differences in the input signal and the output signal, the electrical formation characteristic of the well can be derived.

A method of communicating along a piping structure is also provided. The method is accomplished by predistorting an input signal and inputting the input signal onto the piping structure. The input signal is transmitted from a first location on the piping structure. An output signal is then received at a second location on the piping structure, the output signal being substantially similar to a desired target signal.

BRIEF DESCRIPTION OF THE DRAWINGS

FIG. 3A is an equivalent circuit diagram of a communications path on which the communications system of FIG. 2 transmits and receives signals.

FIG. 3B is a schematic of an input signal being transmitted from a first location on a piping structure and being received as an output signal at a second location on the piping structure.

FIG. 5 is a vertical section schematic of an oil well having a measuring system according to the present invention, the well being completed in a multi-layer formation.

FIG. 6 is a schematic of a pair of waveforms illustrating signal predistortion differences due to changing reservoir conditions.

DESCRIPTION OF THE PREFERRED EMBODIMENTS

Figure 1:
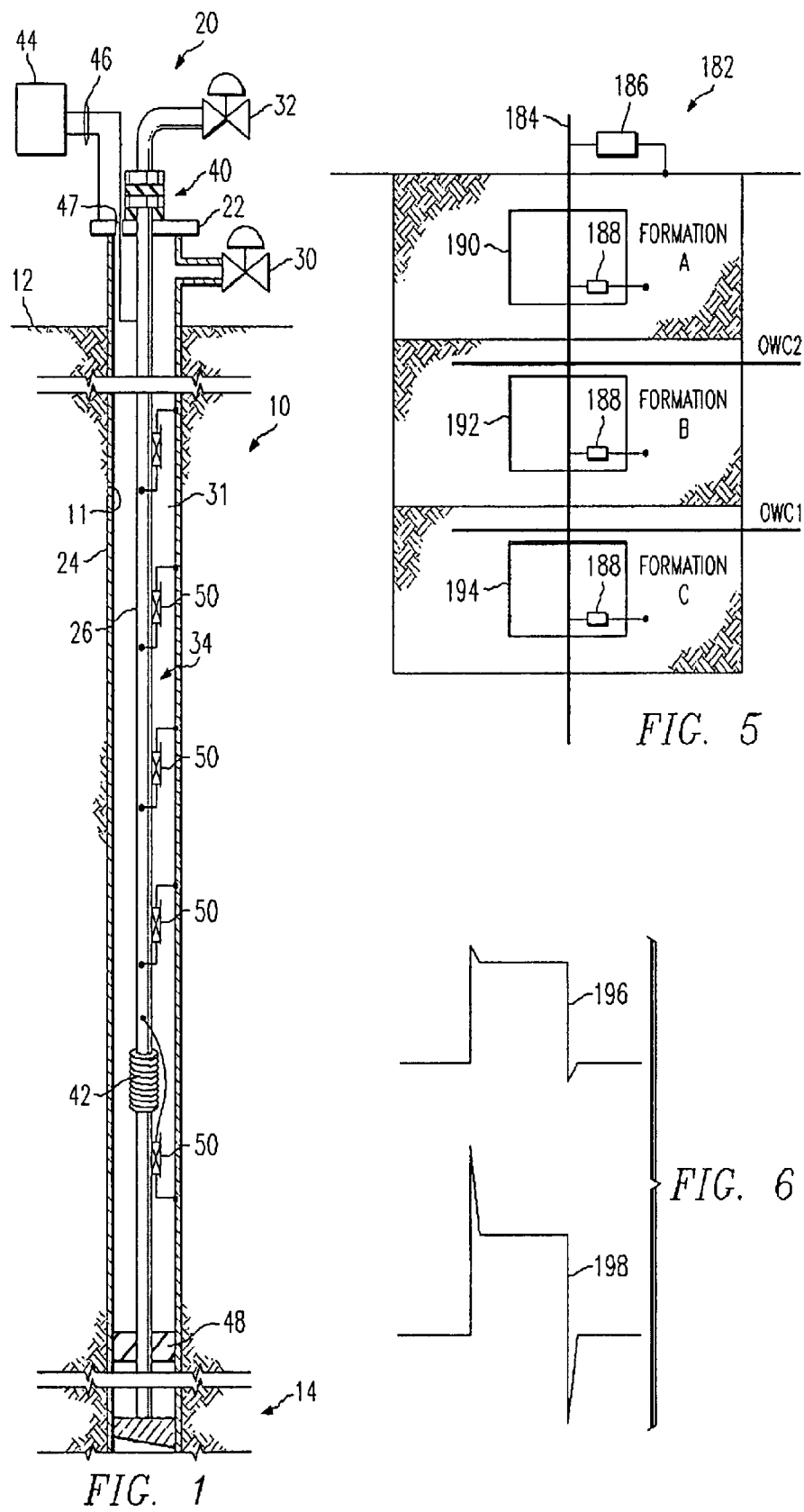
FIG. 1 is a schematic front view of a petroleum well according to the present invention, the petroleum well having a tubing string and a casing positioned within a borehole.

As used in the present application, a "piping structure" can be one single pipe, a tubing string, a well casing, a pumping rod, a series of interconnected pipes, rods, rails, trusses, lattices, supports, a branch or lateral extension of a well, a network of interconnected pipes, or other structures known to one of ordinary skill in the art. The preferred embodiment makes use of the invention in the context of an oil well where the piping structure comprises tubular, metallic, electrically-conductive pipe or tubing strings, but the invention is not so limited. For the present invention, at least a portion of the piping structure needs to be electrically conductive, such electrically conductive portion may be the entire piping structure (e.g., steel pipes, copper pipes) or a longitudinal extending electrically conductive portion combined with a longitudinally extending non-conductive portion. In other words, an electrically conductive piping structure is one that provides an electrical conducting path from one location where a power source is electrically connected to another location where a device and/or electrical return is electrically connected. The piping structure will typically be conventional round metal tubing, but the cross-sectional geometry of the piping structure, or any portion thereof, can vary in shape (e.g., round, rectangular, square, oval) and size (e.g., length, diameter, wall thickness) along any portion of the piping structure.

A "valve" is any device that functions to regulate the flow of a fluid. Examples of valves include, but are not limited to, bellows-type gas-lift valves and controllable gas-lift valves, each of which may be used to regulate the flow of lift gas into a tubing string of a well. The internal workings of valves can vary greatly, and in the present application, it is not intended to limit the valves described to any particular configuration, so long as the valve functions to regulate flow. Some of the various types of flow regulating mechanisms include, but are not limited to, ball valve configurations, needle valve configurations, gate valve configurations, and cage valve configurations. Valves can be mounted downhole in a well in many different ways, some of which include tubing conveyed mounting configurations, side-pocket mandrel configurations, or permanent mounting configurations such as mounting the valve in an enlarged tubing pod.

The term "modem" is used generically herein to refer to any communications device for transmitting and/or receiving electrical communication signals via an electrical conductor (e.g., metal). Hence, the term is not limited to the acronym for a modulator (device that converts a voice or data signal into a form that can be transmitted)/demodulator (a device that recovers an original signal after it has modulated a high frequency carrier). Also, the term "modem" as used herein is not limited to conventional computer modems that convert digital signals to analog signals and vice versa (e.g., to send digital data signals over the analog Public Switched Telephone Network). For example, if a sensor outputs measurements in an analog format, then such measurements may only need to be modulated (e.g., spread spectrum modulation) and transmitted—hence no analog-to-digital conversion is needed. As another example, a relay/slave modem or communication device may only need to identify, filter, amplify, and/or retransmit a signal received.

The term "processor" is used in the present application to denote any device that is capable of performing arithmetic and/or logic operations. The processor may optionally include a control unit, a memory unit, and an arithmetic and logic unit.

The term "sensor" as used in the present application refers to any device that detects, determines, monitors, records, or otherwise senses the absolute value of or a change in a physical quantity. Sensors as described in the present application can be used to measure temperature, pressure (both absolute and differential), flow rate, seismic data, acoustic data, pH level, salinity levels, valve positions, or almost any other physical data.

Also, the term "wireless" as used in this application means the absence of a conventional, insulated wire conductor e.g. extending from a downhole device to the surface. Using the tubing and/or casing as a conductor is considered "wireless."

The term "electronics module" in the present application refers to a control device. Electronics modules can exist in many configurations and can be mounted downhole in many different ways. In one mounting configuration, the electronics module is actually located within a valve and provides control for the operation of a motor within the valve. Electronics modules can also be mounted external to any particular valve. Some electronics modules will be mounted within side pocket mandrels or enlarged tubing pockets, while others may be permanently attached to the tubing string. Electronics modules often are electrically connected to sensors and assist in relaying sensor information to the surface of the well. It is conceivable that the sensors associated with a particular electronics module may even be packaged within the electronics module. Finally, the electronics module is often closely associated with, and may actually contain, a modem for receiving, sending, and relaying communications from and to the surface of the well. Signals that are received from the surface by the electronics module are often used to effect changes within downhole controllable devices, such as valves. Signals sent or relayed to the surface by the electronics module generally contain information about downhole physical conditions supplied by the sensors.

1. Downhole Communication System

Referring to FIG. 1 in the drawings, a petroleum well according to the present invention is illustrated. The petroleum well is a gas-lift well 10 having a borehole 11 extending from a surface 12 into a production zone 14 that is located downhole. A production platform 20 is located at surface 12 and includes a hanger 22 for supporting a casing 24 and a tubing string 26. Casing 24 is of the type conventionally employed in the oil and gas industry. The casing 24 is typically installed in sections and is cemented in borehole 11 during well completion. Tubing string 26, also referred to as production tubing, is generally conventional comprising a plurality of elongated tubular pipe sections joined by threaded couplings at each end of the pipe sections. Production platform 20 also includes a gas input throttle 30 to permit the input of compressed gas into an annular space 31 between casing 24 and tubing string 26. Conversely, output valve 32 permits the expulsion of oil and gas bubbles from an interior of tubing string 26 during oil production.

Gas-lift well 10 includes a communication system 34 for providing power and two-way communication downhole in well 10. Communication system 34 includes a lower ferromagnetic choke 42 that is installed on tubing string 26 to act as a series impedance to electric current flow. The size and material of ferromagnetic chokes 42 can be altered to vary the series impedance value. Hanger 22 includes an insulated portion 40 that electrically insulates tubing string 26 from casing 24 and from the remainder of the tubing string located above surface 12. The section of tubing string 26 between insulated portion 40 and lower choke 42 may be viewed as a power and communications path (see also FIGS. 2 and 3A). Lower choke 42 is manufactured of high permeability magnetic material and is mounted concentric and external to tubing string 26. Choke 42 is typically hardened with injected epoxy to withstand rough handling.

A computer and power source 44 having power and communication feeds 46 is disposed outside of borehole 11 at surface 12. Communication feeds 46 pass through a pressure feed 47 located in hanger 22 and are electrically coupled to tubing string 26 below insulated portion 40 of hanger 22. Power and communications signals are supplied to tubing string 26 from computer and power source 44.

A plurality of downhole devices 50 is electrically coupled to tubing string 26 between insulated portion 40 and lower ferromagnetic choke 42. Some of the downhole devices 50 comprise controllable gas-lift valves. Other downhole devices 50 may comprise electronics modules, sensors, spread spectrum communication devices (i.e. modems), or conventional valves. Although power and communication transmission take place on the electrically isolated portion of the tubing string, downhole devices 50 may be mechanically coupled above or below lower choke 42.

Figure 2:
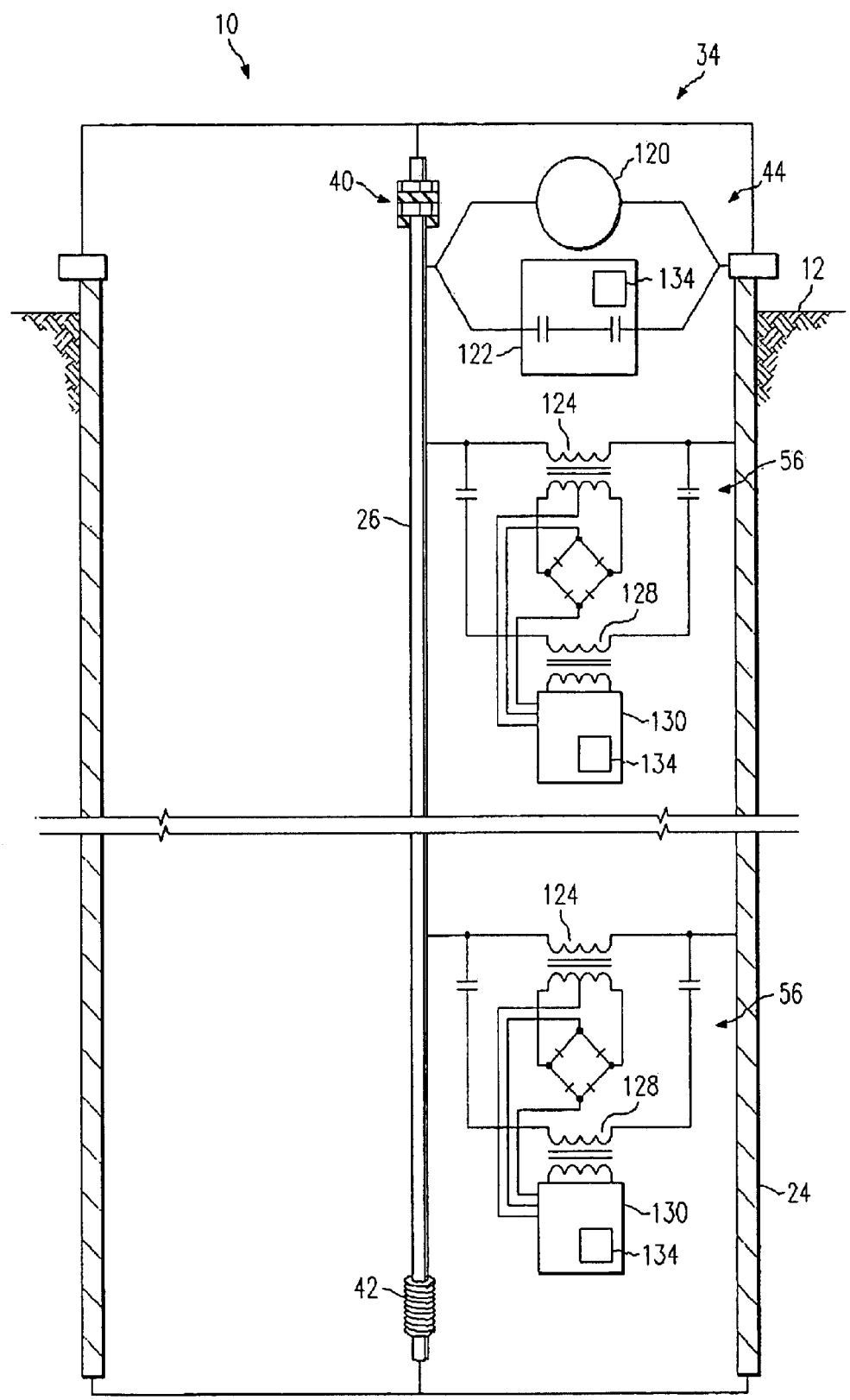
FIG. 2 is an electrical schematic of a communications system according to the present invention, the communications system being positioned within the borehole of the petroleum well of FIG. 1.

Referring to FIG. 2 in the drawings, communication system 34 is illustrated in more detail. Communication system 34 includes all of the components required to communicate along tubing string 26 and casing 24. One of these components, computer and power source 44, includes an AC power source 120 and a master modem 122 electrically connected between casing 24 and tubing string 26. Two electronics modules 56 are connected to the tubing string 26 and the casing 24 downhole. Fewer or more electronics modules could be positioned downhole. Although electronics modules 56 appear identical, the modules 56 may contain or omit different components. A likely difference in each module could include a varying array of sensors for measuring downhole physical characteristics. It should also be noted that the electronics modules 56 may or may not be an integral part of a controllable valve. Each electronics module includes a power transformer 124 and a data transformer 128.

A slave modem 130 is electrically coupled to data transformer 128 and is electrically connected to tubing string 26 and casing 24. Slave modem 130 communicates information to master modem 122 such as sensor information received from electronics module 56. Slave modem 130 receives information transmitted by master modem 122 such as instructions for controlling the valve position of downhole controllable valves. Additionally, each slave modem 130 is capable of communicating with other slave modems in order to relay signals or information.

The present invention is directed to delivering signals along communication system 34 between a first modem and a second modem. It is important to note that the designation of "first modem" and "second modem" can be given to any of the modems previously mentioned (master modem 122 and slave modems 130). More specifically, master modem 122 could be designated as the first modem and one of the slave modems 130 could be designated the second modem.

An input signal is typically supplied by master modem 122 (the first modem) to tubing string 26. An output signal is received by slave modem 130 (the second modem). An alternative designation could be to designate one of the slave modems 130 as the first modem and another slave modem 130 as the second modem. Depending on the communication range that the slave modems 130 are capable of providing under specific well conditions, the transmission of sensor and control data up and down the well may require the relaying of signals between slave modems 130 rather than being passed directly between the surface and the selected downhole devices 50 (see FIG. 1). Under these circumstances, communication would be taking place between the designated slave modems 130.

Preferably the slave modems 130 are placed so that each can communicate with the next two slave modems up the well and the next two slave modems down the well. This redundancy allows communications to remain operational even in the event of the failure of one of the slave modems 130.

Because of the lossy transmission involved in communicating signals along a piping structure (e.g. a tubing string or casing), the input signal that is imparted to the piping structure by the first modem is often altered during transmission, resulting in the output signal received by the second modem being different from the original input signal. In any particular case, a desired target signal is the signal that is intended to be received at the second modem. By properly altering the input signal prior to transmission, the output signal received at the second modem will be substantially similar to the desired target signal.

The alteration performed on the input signal should be considered a predistortion of the input signal. Each of the modems illustrated in FIG. 2 (i.e. master modem 122 and slave modem 130) contains a processor 134 for determining a predistortion solution for each input signal. The amount and method of predistortion applied to the input signal is determined based on mathematical modeling of the communications path on which the input signal is transmitted. The mathematical treatment of this lossy communications path is detailed below.

2. Derivation of the Lossy Transmission Line Model

Suppose that a single tubing string is suspended inside a fluid-filled casing using insulated packers and that the casing and tubing string are used as the two conductors for a transmission line. While this configuration is similar to that of a coaxial cable, it is unique in that the dielectric material separating the cylindrical transmission lines may conduct electricity. Referring to FIG. 3A in the drawings, an equivalent circuit diagram for this situation is illustrated and relies upon the following electrical characteristics of the transmission line:

R=total series resistance per unit length, shown at a resistor 140,

L=total series inductance per unit length, shown at an inductor 142,

G=shunt conductance per unit length, shown at a resistor 144, and

C=shunt capacitance per unit length, shown at a capacitor 146.

Let a time-varying voltage be applied to the left-hand side of the circuit. Then Kirchoffs law gives us the following relation between the voltage, v(x,t) and the current, i(x,t).

$$v(x+dx,t) - v(x,t) = -R \cdot dx \cdot i(x,t) - L \cdot dx \cdot \frac{\partial i}{\partial t}(x,t),$$

$$i(x+dx,t) - i(x,t) = -G \cdot dx \cdot v(x,t) - C \cdot dx \cdot \frac{\partial v}{\partial t}(x,t).$$

Dividing by dx and taking partials with respect to x, we find $$\frac{\partial^2 v}{\partial x^2} = (LC)\frac{\partial^2 v}{\partial t^2} + (LG+RC)\frac{\partial v}{\partial t} + (RG)v(x,t),$$

$$\frac{\partial^2 i}{\partial x^2} = (LC)\frac{\partial^2 i}{\partial t^2} + (LG+RC)\frac{\partial v}{\partial t} + (RG)i(x,t).$$

Passing to the frequency domain by substituting a time-harmonic signal such that $$\frac{\partial v}{\partial t} = j\omega v(x,t),$$

we find that $$\frac{\partial^2 v}{\partial x^2} - (R+j\omega L)(G+j\omega C)v(x,t) = 0,$$

$$\frac{\partial^2 i}{\partial x^2} - (R+j\omega L)(G+j\omega C)i(x,t) = 0.$$

Thus, $V(x) = V_1 1^{-\gamma x} + V_2 e^{\gamma x}$ and $I(x) = I_1 e^{-\gamma x} + I_2 e^{\gamma x}$, where the attenuation constant is given by $\gamma = \sqrt{(R+j\omega L)(G+j\omega C)} = \alpha + j\beta$. The constant $\alpha$ is called the "attenuation component" with $\beta$ yielding the frequency-depended wave velocity of $$v_\omega = \frac{\omega}{\beta}.$$

Furthermore, the ratio of the voltage and current phasors give the characteristic impedance of the transmission line as $$Z_0 = \sqrt{\frac{R+j\omega L}{G+j\omega C}}.$$

At high frequencies where the skin effect is significant, we find the skin effect impedance becomes $$Z_{skin} = K\sqrt{j\omega}.$$

Therefore, the attenuation constant may be expressed as a function of the complex angular rate of the phasor, $p=i\omega$ $$\gamma(p) = [(K\sqrt{p}+pL)(G+pC)]^{1/2}.$$

Expanding this using the binomial expansion formula for fractional exponents, it yields $$\gamma(p) = p\sqrt{LC} + \frac{K}{2}\sqrt{\frac{C}{L}}p^{\frac{1}{2}} + \frac{G}{2}\sqrt{\frac{L}{C}}p^0 + \frac{KG}{2\sqrt{LC}}p^{\frac{-1}{2}} + \text{higher order terms},$$

where the higher order terms are on the order of $O(p^{-1/2}) = O(1/\sqrt{f})$. The constant $T=\sqrt{LC}$ represents the signal velocity, as it propagates down the entire length of the transmission line.

To facilitate the foregoing analysis, assume the shunt conductance of the transmission line is negligible so that G=0. This may represent a case in which the completion fluid is an oil or very low conducting emulsion. Following the analysis of Wigington and Nahman in their 1957 article, see, Wiggington, R. I., Nahman, N. S., "Transient Analysis of Coaxial Cables Considering Skin Effect," Proceedings of the IRE, February 1957, pp. 166–174, the attenuation exponent $\gamma$ (p) takes the form $$\gamma(p) = \sqrt{(K\sqrt{p} + Lp)pC} \approx pT + \left(\frac{K}{2R_0}\right)p^{\frac{1}{2}},$$

where $$R_0 = \sqrt{\frac{L}{C}}.$$

Therefore, for a transmission line of length l, the ratio of the received voltage to the transmitted voltage is $$\frac{V(l)}{V(0)} = e^{-l(pT + (K/(2R_0))\sqrt{p})} = f(p).$$

This may be used to define the transfer function that characterizes the signal distortion caused by skin-effect resistance and other losses. The transfer function g(t) may be derived by taking the inverse Laplace transform of the function $f(p)$, $$L^{-1}(G(p)) = g(t).$$

In special case that the shunt loss G is negligible, this becomes $$g(t) = \begin{cases} \alpha(t - Tl)^{-\frac{3}{2}} e^{-\beta/(t-Tl)}, & \text{for } t >= Tl \\ 0, & \text{otherwise.} \end{cases}$$

Here, the constants $\alpha$ and $\beta$ are given by $LK/(4R_0\sqrt{\pi})$ and $$\left(\frac{LK}{4R_0}\right)^2,$$

respectively. When the shunt loss, G, is non-zero, the expression for the attenuation exponent involves three additional terms (given above) and complicates the inverse Laplace transform. Although a closed-form expression is omitted from this paper, a numerical approximation to the transfer function may be constructed using commonly available software applications (e.g. Matlab or Mathematica).

3. Analytical Characterization of the Received Signal

Using the numerically or analytically derived system transfer function g(t), it is possible to characterize an output signal $F_{out}(t)$ as a convolution of g(t) with the function representing an input signal, $F_{in}(t)$, applied to the transmission line (i.e., tubing and casing). That is, $$F_{out}(t) = \int_0^\infty F_{in}(t - \tau)g(\tau)d\tau.$$

Given the step function, $$h(t) = \begin{cases} 0, & \text{for } t < 0, \\ 1, & \text{for } t \geq 0, \end{cases}$$

its associated output function is $$F_{out}(t) = \begin{cases} \text{cerf}\left(\sqrt{\frac{\beta}{(t-Tl)}}\right), & \text{for } t - Tl \geq 0, \\ 0, & \text{otherwise.} \end{cases}$$

For the sake of simplifying notation, we introduce a new variable, x=t−Tl, which represents time delayed by the time required for a signal to propagate down the transmission line. Next, given the linear ramp function with rise time $\alpha$, $$F_{in}^{ramp}(t) = \begin{cases} 0, & \text{for } t < 0, \\ \frac{t}{a}, & \text{for } 0 \leq t \leq a, \\ 1, & \text{for } t > a, \end{cases}$$

the function describing its associated output is given by $$F_{out}^{ramp}(t) = F_{out}(x + Tl) = \frac{1}{a}\int_{x-a}^{x} \text{cerf}\left(\sqrt{\frac{\beta}{\tau}}\right)d\tau, \text{ when } x \geq 0.$$

Using this formula, it is possible to characterize the response of any pulse signal of duration $t_p$ and with rise and fall time $\alpha$. Namely, for $$F_{in}^{pulse}(t) = \begin{cases} 0, & \text{for } t < 0, \\ \frac{t}{a}, & \text{for } 0 \leq t \leq a, \\ 1, & \text{for } a < t \leq a + t_P, \\ -\frac{t}{a} + \left(2 + \frac{t_p}{a}\right), & \text{for } a + t_P < t \leq 2a + t_P, \\ 0, & \text{for } t > 2a + t_P, \end{cases}$$

$$= F_{in}^{ramp}(t) - F_{in}^{ramp}(t - (a + t_P))$$

we have $$F_{out}^{pulse}(t) = F_{out}^{pulse}(x+Tl) = (F_{in}^{ramp}(t) - F_{in}^{ramp}(t-(\alpha+t_p)))*g(t).$$

4. Application of Control Theory to Derive Optimal Waveform Predistortion

Referring to FIG. 3B in the drawings, an input signal is transmitted from a first location 148 on a piping structure 150 (e.g. tubing string or casing). The input signal is received as an output signal at a second location 151 on the piping structure 150. Suppose we need to best choose the input signal (i.e. waveform), $F_m$ (t), in such a way that the resulting output signal (i.e. waveform), $F_{out}(t)$, most closely matches a desired target signal (i.e. waveform), $F_{target}(t)$.

Writing the functions representing the input, output and desired target signals as piecewise linear approximations $$F_{in}(t) = c_0\Phi_0(t) + c_1\Phi_1(t) + \ldots + c_{N-1}\Phi_{N-1}(t),$$

$$F_{out}(t) = w_0\Phi_0(t) + w_1\Phi_1(t) + \ldots + w_{N-1}\Phi_{N-1}(t),$$

$$F_{target}(t) = t_0\Phi_0(t) + t_1\Phi_1(t) + \ldots + t_{N-1}\Phi_{N-1}(t),$$

where $\Phi_j(t)$ is the piecewise linear "hat" basis function at the transmitter (system control) of width h=$\Delta$t and centered at node $t_j=jh$ and $\Phi_j(t)=\Phi_j(t-Tl)$ is the basis function at the receiver location (system state delayed by time constant T).

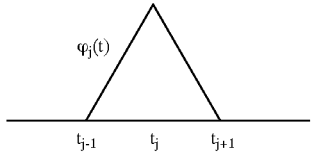

Using the distortion transfer function, g(t), we may write the output function as a weighted sum of convolutions with the piecewise linear basis functions, $$F_{out}(t) = \sum_{j=0}^{N-1} c_j(\varphi_j(t)*g(t)).$$

To determine the input signal that must yield a "best approximation" to the desired target function, an optimal control problem is formulated. Towards this end, we wish to find the control vector $\vec{c}=(c_0 \ldots c_{N-1})^T$ that minimizes the quadratic functional $$J(\vec{c})=\eta_1\|F_{out}-F_{target}\|^2+\eta_2\|\vec{c}\|^2$$

subject to the linear constraint that $F_{out}(t)=F_{in}(t)*g(t)$ and where $\eta_1$ and $\eta_2$ are any desired weighting coefficients (non-negative).

To solve this optimal control problem, the associated output signal for each input basis function, $\Phi_j(t)$, is calculated. These output signals are given by $\Phi_j(t)*g(t)$ and may each be approximated by a piecewise linear interpolant, $$\varphi_j(t)*g(t) = \sum_{i=0}^{N-1} s_i^j \tilde{\varphi}_i(t).$$

The vector $\vec{s}^j=(s_0^j \ldots s_{N-1}^j)^T$, formed by extracting the coefficients of this linear approximation to $\Phi_j(t)*g(t)$ represents the state vector response evoked by the application of a single basis function of the control space.

Define the matrix of evoked state responses for each of the basis functions by $$M=(s^0 s^1 \ldots s^{N-1}).$$

Then for each given input, $F_{in}(t)=c_0\Phi_0(t)+c_1\Phi_1(t)+ \ldots +c_{N-1}\Phi_{N-1}(t)$, the associated output, $F_{out}(t)=w_0\Phi_0(t)+w_1\Phi_1(t)+ \ldots +w_{N-1}\Phi_{N-1}(t)$, is given by $$\vec{w}=M\vec{c}.$$

Rephrasing the control problem as to minimize the quadratic "cost" functional $$J(\vec{c})=\eta_1\|M\vec{c}-\vec{t}\|^2+\eta_2\|\vec{c}\|^2,$$

where $F_{target}(t)=t_0\Phi_0(t)+t_1\Phi_1(t)+ \ldots +t_{N-1}\Phi_{N-1}(t)$ is the desired target signal and $\vec{s}=M\vec{c}$ is the linear constraint. Note that in this case, the matrix M was derived using the Laplace transform and convolutions of the derived transfer function with a set of basis functions. Alternatively, M could be represented as a forward solution operator for the coupled wave equations referenced herein. Now, the gradient of the cost functional is given by $$\nabla J(\vec{c})=2\eta_1 M^T(M\vec{c}-\vec{t})+2\eta_2\vec{c},$$

and the optimal control is achieved when $\nabla J(\vec{c})=0$ or when $$(\eta_1 M^T M+\eta_2 I)\vec{c}=M^T\vec{c}.$$

The solution of this linear system yields the necessary predistortion required to produce a "best" approximation to the desired target signal at the receiver. In the case that M is a forward solution operator for the wave equation, $M^T$ is the backwards-in-time solution operator for the wave equation with sign changes on the first derivative coefficients.

5. Implementation

The method and apparatus of the present invention broadly includes a means of compensating for the skin effect resistance of a transmission path by predistorting an emitted wave, or input signal, at a transmitting station on the transmission path so as to produce an output wave, or output signal at a receiver station that matches an actual desired target wave. In other words, the input signal is consciously distorted prior to transmission in such a way that the physics of the lossy transmission line constructively distorts the applied predistortion and results in a near-perfect replication of the input signal at the receiver station.

The predistortion amount, or predistortion solution, is obtained by developing a model for the skin effect resistance or attenuation caused by the transmission path. As previously described, this model is based on an equivalent circuit model for a tubing string suspended in a casing filled with completion fluid. After developing a model, a closed system control problem is formulated together with an iterative means of solving the control problem. The control problem has an optimal solution (i.e., a predistorted input signal) when the received output signal is a "best match," or is substantially similar to the desired target signal as measured by a least squares method. This iterative process defines the power-on negotiation process that must take place between communication station pairs so as to optimally determine the level of predistortion required to compensate for the skin effect attenuation. Other methods of developing such a model will be known to those of skill in the art, such as Artificial Neural Net and other AI solutions.

Figure 4:
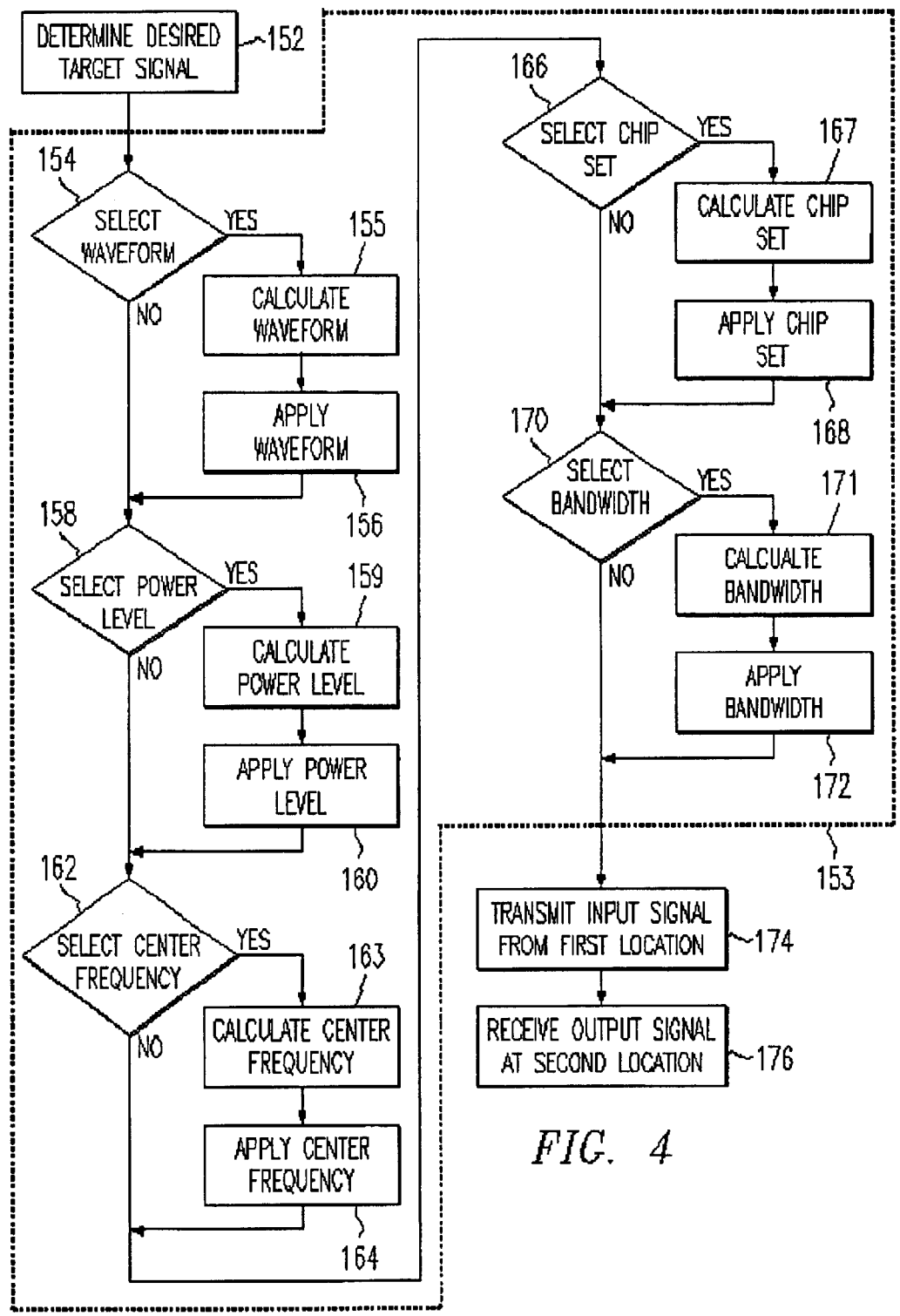
FIG. 4 is a flowchart illustrating a method of predistorting a signal according to the present invention, the signal being predistorted prior to transmission along the communications path of FIG. 3.

Referring to FIG. 4 in the drawings, the steps involved in optimally predistorting the input signal are illustrated. It should be noted that the actual selection and determination of the predistorted input signal is based on the mathematical solution to the control problem described previously. The first step, "Determine Desired Target Signal" 152, is performed prior to Predistort Input Signal 153. In a lossless transmission, the desired target signal would be equal to the input signal transmitted and the output signal received. However, since the transmission is lossy, the input signal is predistorted to achieve an output signal that is substantially similar to the desired target signal. Predistort Input Signal 153 includes the following substeps: Select Waveform 154, Calculate Waveform 155, Apply Waveform 156, Select Power Level 158, Calculate Power Level 159, Apply Power Level 160, Select Center Frequency 162, Calculate Center Frequency 163, Apply Center Frequency 164, Select Chip Set 166, Calculate Chip Set 167, Apply Chip Set 168, Select Bandwidth 170, Calculate Bandwidth 171, and Apply Bandwidth 172. Each of the "calculate" and "apply" steps is contingent on the successful determination of the related "select" step. For example, if a spread spectrum communication system is being used to transmit signals, a center frequency does not need to be selected. Instead, Select Chip Set 166 is answered affirmatively such that a chip set is calculated and applied by Calculate Chip Set 167 and Apply Chip Set 168. Alternatively, if an FSK- or PSK-modulated communication system is used, a chip set is not selected. Instead, Select Center Frequency 162 is answered affirmatively such that a center frequency is calculated and applied by Calculate Center Frequency 163 and Apply Center Frequency 164. After completing Predistort Input Signal 153, the predistorted input signal is transmitted in accordance with Transmit Input Signal From First Location 174. This step is presumably performed by the first, or transmitting modem. The second, or receiving modem receives the output signal in accordance with Receive Output Signal at Second Location 176.

It is envisioned that the aforementioned optimal control solver will be implemented in a two-way modem in software and/or hardware form. When a communications session is to be established between two locations, the system first enters into a "tune-up" or calibration phase in which the optimal predistortion is determined at each location so as to maximize the data throughput and/or minimize the bit error rate. During this "tune-up" phase, frequency pairs required to perform FSK (frequency shift keying) modulation or bandwidth/chipset configurations required to transmit data using a suitable spread-spectrum algorithm (such as CDMA) are optimally chosen. Furthermore, if the communication architecture consists of multiple modem stations, multiple predistortion parameters may be derived for each source-receiver pair so that the entire communication infrastructure may operate at maximum efficiency.

Referring to FIG. 5 in the drawings, a measurement system 182 for characterizing the hydrocarbon saturation of a formation is illustrated. Currently, it is envisioned that the casing and production tubing are used as the two conductors for a transmission line, analogous to a coaxial cable. If, on the other hand, the entire production tubing and casing are to be considered as a single conductor 184, a ground-return could be used to complete the electrical connection. In this case, the level of applied predistortion required for a source-receiver pair would yield the homogenized electrical properties for the formation between a source, or first modem 186 and a receiver, or second modem 188. These properties could include the per-unit-length conductance and capacitance and, thus, may be used to characterize the amount of hydrocarbon saturation in the formation outside of the well casing.

Modems 188 are each positioned at a different station along the path of the well that penetrates several formation layers. A station 190 is positioned within Formation A, a station 192 is positioned within Formation B, and a station 194 is positioned within Formation C. Each of the formation layers has measurable per-unit-length resistivity and dielectric properties that depend on the constituent rock composition, geological structure, fluid content (oil, water, gas), invaded fluid content and formation damage due to the presence of the well.

Upon initiating communication sessions with its nearest neighbors, transmission station 194 determines the optimum predistortion required to achieve a given data rate while minimizing the bit error rate. Using numerical analytical tools, such as finite element or finite difference analysis, phenomenological modeling of electromagnetic wave propagation in the subsurface may be conducted. These tools may be directed towards solving the "inverse problem" of deriving electrical formation characteristics—resistivity and dielectric permittivity—given signal predistortion differences in the input and the output signals.

An example of reservoir monitoring using this invention is the tracking and positioning of oil-water contacts over the production lifetime of a field. At the beginning of a field's production life, sufficient oil is present in the reservoir to justify production. The initial oil-water contact at this point in time is OWC1. Since the electrical losses in the oil zone are suppressed by the presence of the fluidic insulator (oil), transceiver stations along a well inside the oil zone are able to transmit signals with minimal attenuation. Referring to FIG. 6 in the drawings, an example of the initial applied predistortion to a transmitted signal 196 is illustrated. However, after years of production, the produced oil and gas are replaced by water from the surrounding formation, resulting in a rise in the oil-water contact to OWC2. Reservoir fluid surrounding the transceiver stations no longer insulate the system from electrical losses. As a result, additional predistortion must be applied to a transmitted signal in order to overcome distortion caused by skin-effect resistance and frequency-dependent attenuation. A new predistorted waveform 198 is also depicted in FIG. 6. By analyzing the signal predistortion differences in signals 196 and 198, it is possible to derive, for instance, the new location of the oil water contact, OWC2.

Even though many of the examples discussed herein are applications of the present invention in petroleum wells, the present invention also can be applied to other types of wells, including but not limited to water wells and natural gas wells.

One skilled in the art will see that the present invention can be applied in many areas where there is a need to provide a communication system within a borehole, well, or any other area that is difficult to access. Also, one skilled in the art will see that the present invention can be applied in many areas where there is an already existing conductive piping structure and a need to route power and communications to a location on the piping structure. A water sprinkler system or network in a building for extinguishing fires is an example of a piping structure that may be already existing and may have a same or similar path as that desired for routing power and communications. In such case another piping structure or another portion of the same piping structure may be used as the electrical return. The steel structure of a building may also be used as a piping structure and/or electrical return for transmitting power and communications in accordance with the present invention. The steel rebar in a concrete dam or a street may be used as a piping structure and/or electrical return for transmitting power and communications in accordance with the present invention. The transmission lines and network of piping between wells or across large stretches of land may be used as a piping structure and/or electrical return for transmitting power and communications in accordance with the present invention. Surface refinery production pipe networks may be used as a piping structure and/or electrical return for transmitting power and communications in accordance with the present invention. Thus, there are numerous applications of the present invention in many different areas or fields of use.

It should be apparent from the foregoing that an invention having significant advantages has been provided. While the invention is shown in only a few of its forms, it is not just limited but is susceptible to various changes and modifications without departing from the spirit thereof.

We claim:

1. A communication system comprising:
   a pipe member;
   a first modem electrically connected to the pipe member at a first location for transmitting an input signal along the pipe member;
   a second modem electrically connected to the pipe member at a second location for receiving an output signal along the pipe member after the first modem transmits the input signal; and a processor coupled to the first modem for predistorting the input signal prior to the input signal being transmitted by the first modem to the second modem along the pipe member.

2. The communications system according to claim 1 wherein the predistortion of the input signal prior to transmission is such that the output signal received by the second modem is substantially similar to a target signal.

3. The communications system according to claim 1 wherein the processor is an integral portion of the first modem.

4. The communications system according to claim 1 further comprising:

a second processor for predistorting a second input signal transmitted by the second modem along the pipe member; and wherein the first modem receives a second output signal after the second modem transmits the second input signal.

5. The communications system according to claim 4 wherein the predistortion of the second input signal prior to transmission is such that the second output signal received by the first modem is substantially similar to a second target signal.

6. The communications system according to claim 1 wherein the pipe member is an interconnected plurality of pipes in a borehole of a petroleum well.

7. In a petroleum well having a piping structure and a wireless communication system for communicating signals along the piping structure, a method for delivering an input signal from a first location to a second location, the method comprising the steps of:

determining an optimum predistortion amount for the input signal to achieve a desired reception of a target signal at the second location;

applying the predistortion amount to the input signal; and transmitting the predistorted input signal along the piping structure from the first location to the second location.

8. The method according to claim 7, wherein the communication system includes a first modem electrically connected to the piping structure at the first location and a second modem electrically connected to the piping structure at the second location.

9. The method of claim 7, wherein the desired target signal approximates a desired data transmission rate while minimizing bit rate error.

10. The method according to claim 7, further comprising the steps of:

providing an electrically insulated portion along the piping structure;

providing an induction choke disposed concentrically around the piping structure; and wherein the transmitting step further comprises transmitting the input signal along the piping structure between the electrically insulated portion and the induction choke.

11. The method according to claim 7, further comprising the steps of:

providing an upper induction choke and a lower induction choke disposed concentrically around the piping structure; and wherein the transmitting step further comprises transmitting the input signal along the piping structure between the upper induction choke and the lower induction choke.

12. In a petroleum well having a borehole and a piping structure disposed within the borehole, the improvement comprising a wireless communications system that predistorts an input signal prior to sending the input signal along the piping structure from a first location to a second location.

13. A petroleum well having a borehole and a piping structure disposed within the borehole comprising:

a first modem electrically connected to the piping structure at a first location, the first modem configured to impart an input signal to the piping structure;

a second modem electrically connected to the piping structure at a second location, the second modem configured to receive an output signal after the input signal is sent by the first modem;

a processor for predistorting the input signal prior to the input signal being transmitted by the first modem along the piping structure; and wherein the input signal is predistorted such that the output signal received by the second modem closely matches a target signal.

14. The petroleum well according to claim 13, wherein the processor is an integral part of the first modem.

15. The petroleum well according to claim 13 further comprising:

an electrically insulated portion located on the piping structure;

a ferromagnetic choke disposed concentrically around the piping structure; and wherein the signals transmitted and received by the first and second modems are communicated along the piping structure between the electrically insulated portion and the ferromagnetic choke.

16. The petroleum well according to claim 13 further comprising:

an upper ferromagnetic choke and a lower ferromagnetic choke disposed concentrically around the piping structure; and wherein the signals transmitted and received by the first and second modems are communicated along the piping structure between the upper and lower ferromagnetic chokes.

17. The petroleum well according to claim 13 wherein the processor predistorts the input signal by calculating and applying a transmitted waveform to the input signal.

18. The petroleum well according to claim 13 wherein the processor predistorts the input signal by calculating and applying a power level to the input signal.

19. The petroleum well according to claim 13 wherein the processor predistorts the input signal by calculating and applying a center frequency to the input signal.

20. The petroleum well according to claim 13 wherein the processor predistorts the input signal by calculating and applying a bandwidth to the input signal.

21. The petroleum well according to claim 13 wherein the processor predistorts the input signal by calculating and applying a chip set to the input signal.

22. The petroleum well according to claim 13 wherein the processor predistorts the input signal by calculating and applying a transmitted waveform, a power level, a center frequency, and a bandwidth to the input signal.

23. The petroleum well according to claim 13 wherein the processor predistorts the input signal by calculating and applying a transmitted waveform, a power level, a chip set, and a bandwidth to the input signal.

24. The petroleum well according to claim 13 wherein the piping structure is production tubing located within the borehole of the well.

25. The petroleum well according to claim 13 wherein the piping structure is a casing cemented within the borehole of the well.

26. The petroleum well according to claim 13 wherein:
the transmission of the input signal along the piping structure is a lossy transmission that causes bit error in the input signal; and
the predistortion of the input signal prior to transmission by the first modem decreases the bit error rate along the piping structure, thereby causing the output signal received by the second modem to approximate the desired target signal.

27. The petroleum well according to claim 13 wherein the processor calculates the proper predistortion for the input signal using finite element analysis to model electromagnetic wave propagation along the piping structure.

28. A measurement system for measuring an electrical formation characteristic in a petroleum well having a borehole and a piping structure disposed within the borehole, the measurement system comprising:
a first modem electrically connected to the piping structure at a first location, the first modem configured to impart an input signal to the piping structure;
a second modem electrically connected to the piping structure at a second location, the second modem configured to receive an output signal after the input signal is sent by the first modem; and
wherein the electrical formation characteristic of the well is derived by observing a signal predistortion difference in the input signal and the output signal.

29. The measurement system according to claim 28, wherein the electrical formation characteristic includes resistivity to electromagnetic wave propagation.

30. The measurement system according to claim 28, wherein the electrical formation characteristic includes dielectric permittivity.

31. The measurement system according to claim 28, wherein the electrical formation characteristics of the petroleum well depend on constituent rock composition, geological structure, fluid content, invaded fluid content, and formation damage caused by the presence of the well.

32. The measurement system according to claim 28, wherein the measurement system is used for tracking oil-water contacts in an oil field.

33. A method for communicating along a piping structure comprising the steps of:
predistorting an input signal;
inputting the predistorted input signal at a first location on the piping structure for transmission along the piping structure; and
receiving an output signal at a second location on the piping structure, the output signal being substantially similar to a desired target signal that was pre-selected prior to predistortion of the input signal.

34. The method according to claim 33 further comprising the steps of:
providing a first modem electrically connected to the piping structure at the first location and a second modem electrically connected to the piping structure at the second location; and
wherein the inputting step is accomplished by the first modem and the receiving step is accomplished by the second modem.

35. The method according to claim 33, wherein the step of predistorting an input signal further comprises the step of calculating and applying a transmitted waveform to the input signal.

36. The method according to claim 33, wherein the step of predistorting an input signal further comprises the step of calculating and applying a power level to the input signal.

37. The method according to claim 33, wherein the step of predistorting an input signal further comprises the step of calculating and applying a center frequency to the input signal.

38. The method according to claim 33, wherein the step of predistorting an input signal further comprises the step of calculating and applying a bandwidth to the input signal.

39. The method according to claim 33, wherein the step of predistorting an input signal further comprises the step of calculating and applying a chip set to the input signal.

40. The method according to claim 33, wherein the step of predistorting an input signal further comprises the step of calculating and applying a transmitted waveform, a power level, a center frequency, and a bandwidth to the input signal.

41. The method according to claim 33, wherein the step of predistorting an input signal further comprises the step of calculating and applying a transmitted waveform, a power level, a chip set, and a bandwidth to the input signal.

42. The method according to claim 33 further comprising:
providing a first modem electrically connected to the piping structure at the first location and a second modem electrically connected to the piping structure at the second location, wherein the inputting step is accomplished by the first modem and the receiving step is accomplished by the second modem; and
calibrating the first modem to optimally predistort the input signal prior to transmission of the input signal along the piping structure such that the output signal received at the second modem is substantially similar to the desired target signal.

43. The method according to claim 42, wherein the step of calibrating the first modem further comprises the step of choosing frequency pairs for performing frequency shift keying modulation.

44. The method according to claim 42, wherein the step of calibrating the first modem further comprises the step of choosing bandwidth/chipset configurations for transmitting signals using a spread spectrum algorithm.

45. The method according to claim 33 further comprising the steps of:
providing an electrically insulated portion along the piping structure;
providing a ferromagnetic choke disposed concentrically around the piping structure; and
wherein the inputting and the receiving steps occur on a section of the piping structure located between the electrically insulated portion and the ferromagnetic choke.

46. The method according to claim 33 further comprising the steps of:
providing an upper ferromagnetic choke and a lower ferromagnetic choke disposed concentrically around the piping structure; and
wherein the inputting and the receiving steps occur on a section of the piping structure located between the upper ferromagnetic choke and the lower ferromagnetic choke.

* * * * *